United States Patent
Wang et al.

(10) Patent No.: US 8,765,213 B2
(45) Date of Patent: Jul. 1, 2014

(54) METHOD FOR MAKING LITHIUM-ION BATTERY ELECTRODE MATERIAL

(75) Inventors: Li Wang, Beijing (CN); Xiang-Ming He, Beijing (CN); Jian-Guo Ren, Beijing (CN); Jian Gao, Beijing (CN); Jian-Jun Li, Beijing (CN); Wei-Hua Pu, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 665 days.

(21) Appl. No.: 12/888,705

(22) Filed: Sep. 23, 2010

(65) Prior Publication Data
US 2011/0195177 A1    Aug. 11, 2011

(30) Foreign Application Priority Data
Feb. 6, 2010 (CN) .......................... 2010 1 0110159

(51) Int. Cl.
*B05D 5/00* (2006.01)
(52) U.S. Cl.
USPC ............................................ 427/74; 427/212
(58) Field of Classification Search
USPC ......................................................... 427/226
See application file for complete search history.

(56) References Cited

U.S. PATENT DOCUMENTS

| 2001/0044260 A1* | 11/2001 | Yancey | 451/41 |
| 2009/0004563 A1* | 1/2009 | Zhong | 429/188 |
| 2009/0280412 A1 | 11/2009 | Imanari et al. | |

FOREIGN PATENT DOCUMENTS

| CN | 101373829 | | 2/2009 |
| CN | 101378119 | | 3/2009 |
| CN | 101378119 A | * | 3/2009 |
| TW | 200830604 | | 7/2008 |

OTHER PUBLICATIONS

Wen et al., "Research on spray-dried lithium titanate as electrode materials for lithium ion batteries," Journal of Power Sources 146, pp. 670-673, 2005.*
Fu et al., "Novel TiO2/C nanocomposites for anode materials of lithium ion batteries," Journal of Power Sources 159, pp. 219-222, 2006.*
Min et al., CN 101378119A, machine translation.*

* cited by examiner

*Primary Examiner* — Robert Vetere
(74) *Attorney, Agent, or Firm* — Novak Druce Connolly Bove + Quigg LLP

(57) ABSTRACT

The present disclosure relates to a method for making an electrode material of lithium-ion batteries. In the method, a carbon source compound is dissolved into a solvent to form a liquid phase solution. A number of titanium dioxide particles are provided and are dispersed into the liquid phase solution. The carbon source compound is pyrolyzed, thereby forming a number of carbon coating titanium dioxide particles. A lithium source solution is provided. The lithium source solution and the carbon coating titanium dioxide particles are mixed, according to a molar ratio in a range from about 4:5 to about 9:10, of lithium element to titanium element, thereby forming a sol. The sol is spray dried to form a number of precursor particles. The precursor particles are heated to form a lithium titanate composite electrode material.

17 Claims, 5 Drawing Sheets

METHOD FOR MAKING LITHIUM-ION BATTERY ELECTRODE MATERIAL

CROSS-REFERENCE TO RELATED APPLICATIONS

This application claims all benefits accruing under 35 U.S.C. §119 from China Patent Application No. 201010110159.0, filed on 2010 Feb. 6, in the China Intellectual Property Office, the contents of which are hereby incorporated by reference.

BACKGROUND

1. Technical Field

The present disclosure relates to methods for making electrode material applied in a lithium-ion battery, and particularly to a method for making a lithium titanate composite electrode material.

2. Description of Related Art

Lithium titanate ($Li_4Ti_5O_{12}$) with spinel structure is a novel electrode material used in energy storage batteries and has received a great deal of interest recently. Lattice parameters of the lithium titanate have extremely small variations when lithium-ions are cycled in and out during a charging and discharging process of the battery. Thus, the lithium titanate has been reported as a "zero strain" electrode material, and has an excellent cycling property. Electrodes made of lithium titanate can undergo many hundreds of cycles without structural disintegration, thereby increasing the lifespan of the batteries, and decreasing an attenuating speed of the specific capacity of the electrodes. However, lithium titanate has lower conductivity, charge and discharge rate, and tap density than other electrode materials such as lithium manganate.

Presently, different methods are used for solving the above problems including: fabricating nanoscale lithium titanate to shorten diffusion paths of lithium ions and increase surface area for electrochemical reaction; mixing conductive carbon particles with the lithium titanate powder, or doping metal ions into the lithium titanate powder. A method for making a lithium titanium composite material is known. In the method, a solid phase lithium salt, a solid phase titanium dioxide ($TiO_2$), and a dispersing agent are mixed according to a certain proportion. The mixture is then ball milled to form a precursor. A number of lithium titanate particles are fabricated by heating the precursor for a period of time. Furthermore, the lithium titanate particles are coated by carbon source by using an immersion method, and then the carbon source is pyrolyzed to form a carbon layer coated on each of the lithium titanate particles. The conductivity and the discharge rate of the lithium titanate composite material are improved by the addition of the carbon layer.

However, the above precursor is formed by using a solid phase mixing method. The lithium salt and the solid phase titanium dioxide are simply mixed together. As a result, the lithium titanate particles are irregularly shaped and vary in diameter. Thus, the carbon source coated on the surfaces of each of the lithium titanate particles is easily segregated and crystallized during pyrolyzing. Accordingly, a carbon layer, formed by pyrolyzing the carbon source, may non-uniformly coat the surfaces of each of the lithium titanate particles, thereby decreasing electrochemical property of the electrode material of lithium-ion battery.

What is needed, therefore, is to provide a method for making a lithium titanate composite electrode material having a uniform carbon layer coating the surfaces of each of the lithium titanate particles.

BRIEF DESCRIPTION OF THE DRAWINGS

Many aspects of the present disclosure can be better understood with reference to the following drawings. The components in the drawings are not necessarily to scale, the emphasis instead being placed upon clearly illustrating the principles of the present embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
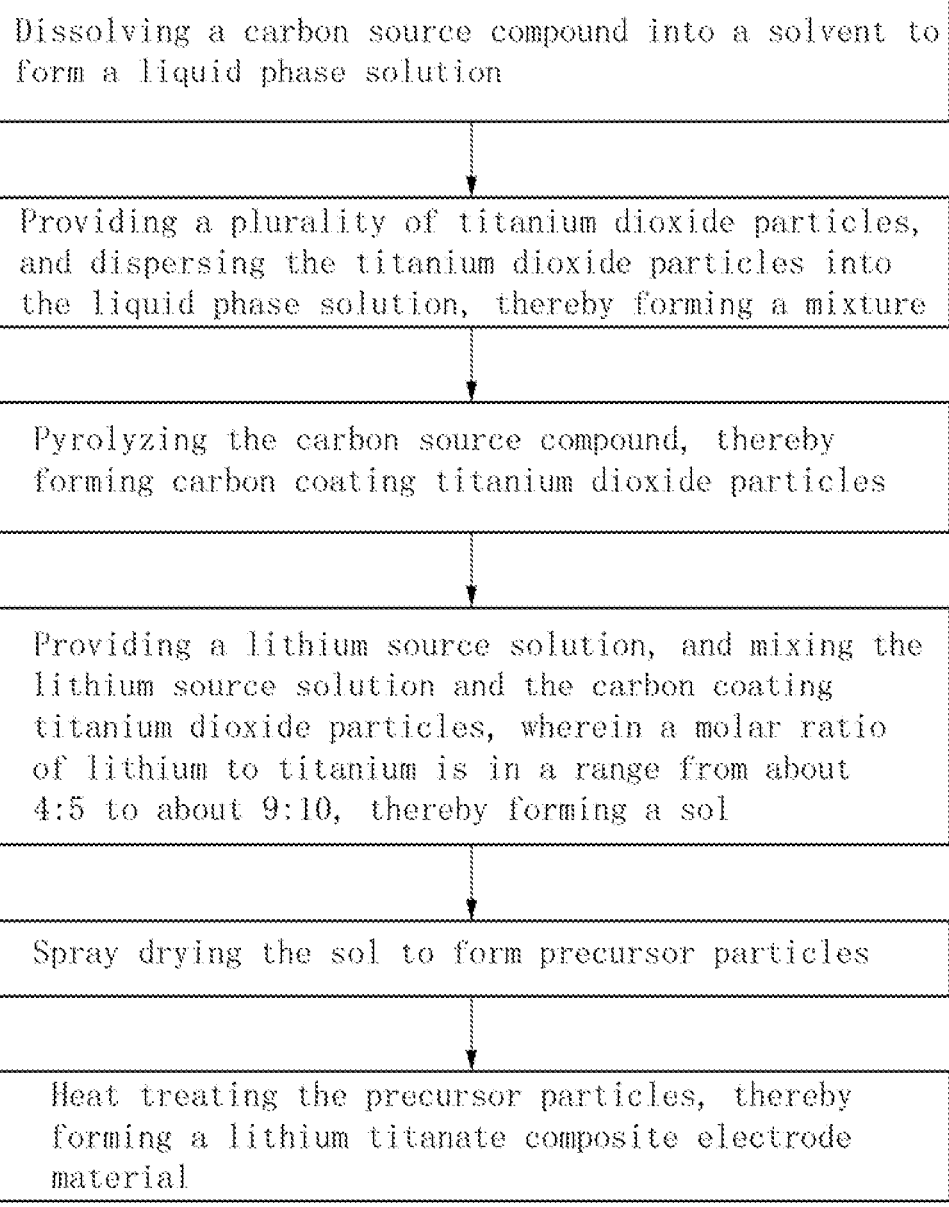
FIG. 1 is a flow chart of one embodiment of a method for making a lithium titanate composite electrode material.
Figure 2:
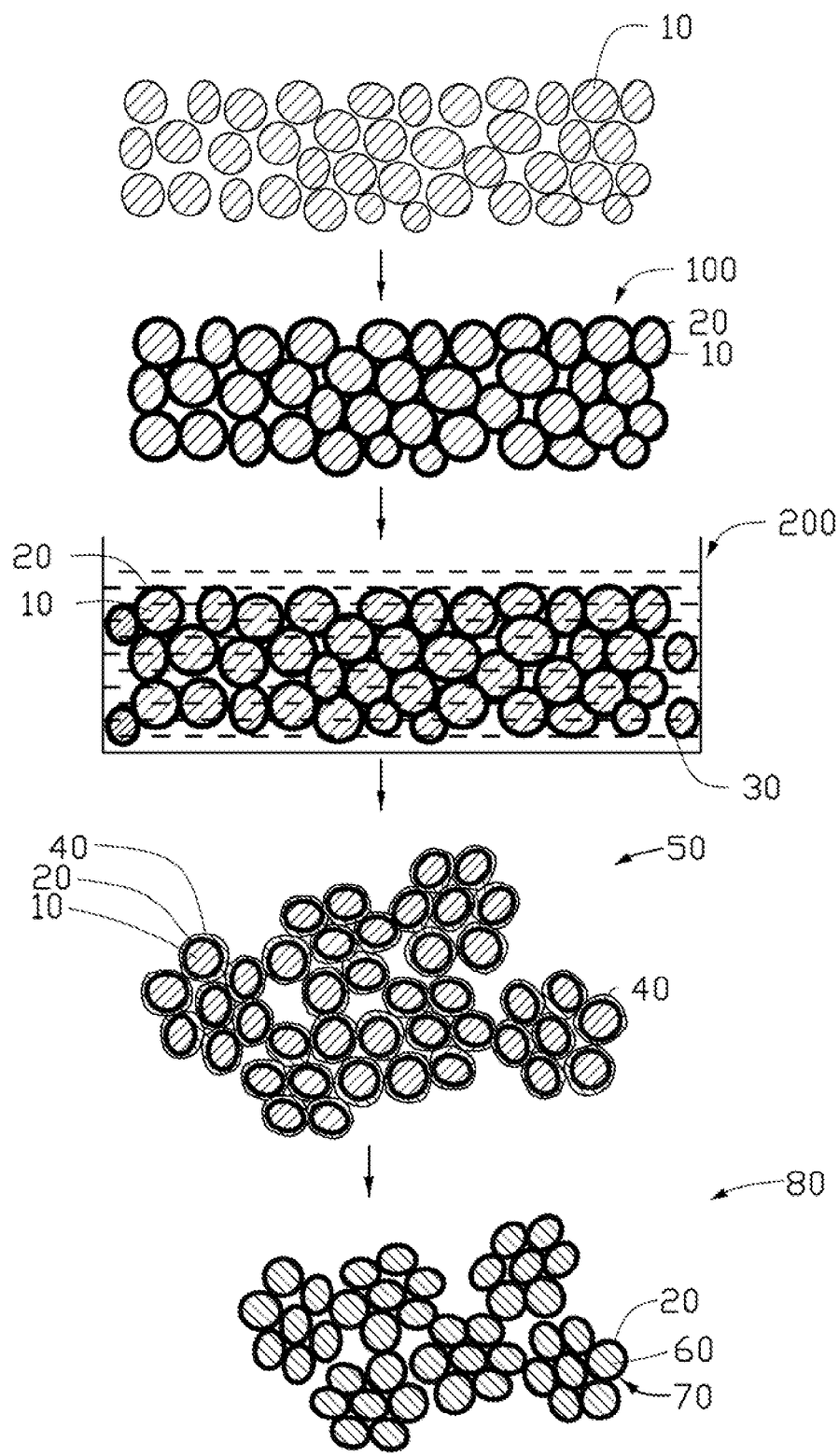
FIG. 2 is a schematic view of the method of FIG. 1.
Figure 3:
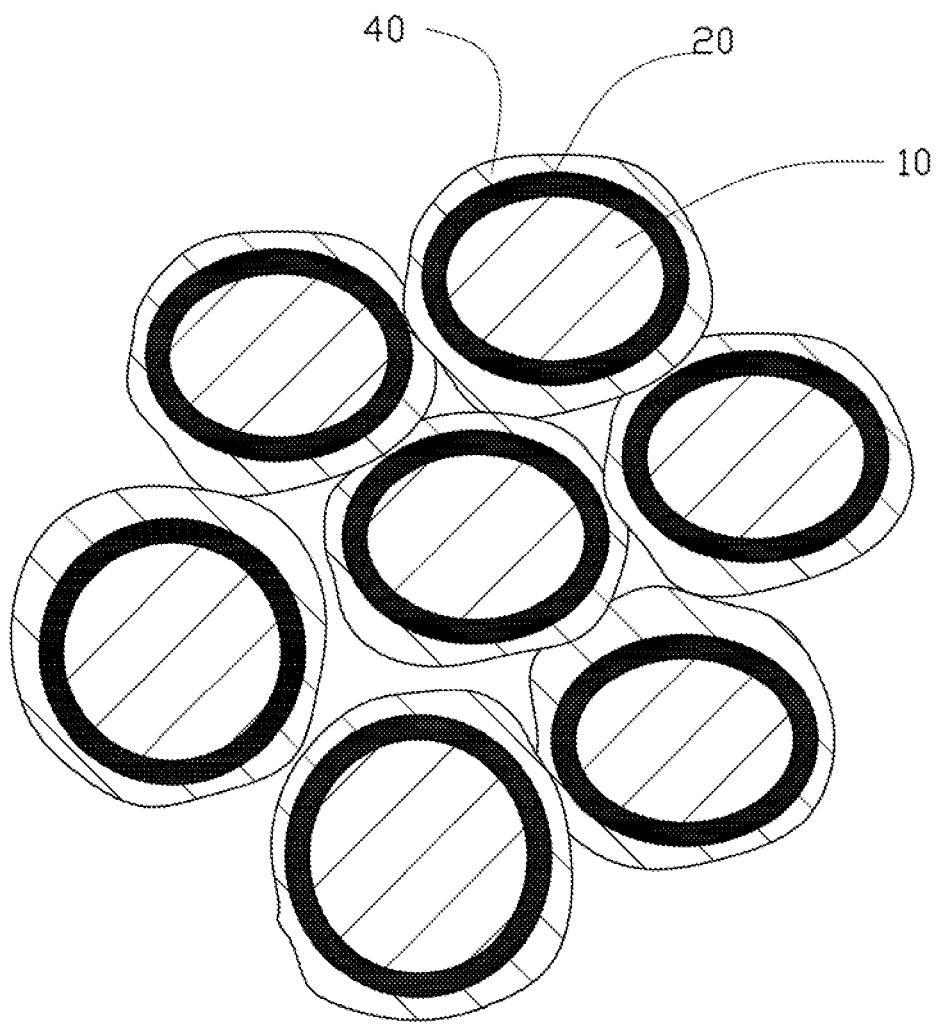
FIG. 3 is an enlarged view of a plurality of carbon coating titanium dioxide particles, further coated by a lithium hydroxide layer, which are made using the method of FIG. 2.

Referring to FIGS. 1, 2, and 3, one embodiment of a method for making a lithium titanate composite electrode material includes the steps of:

S1, dissolving a carbon source compound into a solvent to form a liquid phase solution;

S2, providing a plurality of titanium dioxide particles 10, and dispersing the titanium dioxide particles 10 into the liquid phase solution, thereby forming a mixture;

S3, pyrolyzing the carbon source compound, thereby forming carbon coating titanium dioxide particles 100;

S4, providing a lithium source solution 30, and mixing the lithium source solution 30 and the carbon coating titanium dioxide particles 100, wherein a molar ratio of lithium to titanium is in a range from about 4:5 to about 9:10, thereby forming a sol 200;

S5, spray drying the sol 200 to form precursor particles 50;

S6, heat treating the precursor particles 50, thereby forming a lithium titanate composite electrode material 80.

In step S1, the carbon source compound can be a reductive organic compound and can be dissolved in water. The reductive organic compound can be pyrolyzed to form a carbon residue. The reductive organic compound can be saccharose, dextrose, phenolic resin, polyacrylic acid, polyacrylonitrile, polyethylene glycol, or polyvinyl alcohol. In one embodiment, the carbon source compound is saccharose. The solvent can be water, ethanol, or acetone. In one embodiment, the solvent is water. The water can be distilled water or deionized water to avoid introducing impurities.

In addition, concentration of the liquid phase solution should be suitably set. If the concentration of the liquid phase solution is too great, the titanium dioxide particles 10 may be non-uniformly dispersed in the liquid phase solution. If the concentration of the liquid phase solution is too small, a viscosity of the liquid phase solution would be small, and the carbon layer formed by step S3 may not sufficiently coat surfaces of each of the titanium dioxide particles 10. The concentration of the liquid phase solution can range from about 10% to about 40%. In one embodiment, the concentration of the liquid phase solution is 15%.

In step S2, a quantity of the titanium dioxide particles 10 can be set as a molar ratio, of about 1:10 to about 2:1, of the carbon element of the carbon source compound to the titanium element of the titanium dioxide particles 10.

A diameter of each of the titanium dioxide particles 10 can be in a range from about 50 nanometers (nm) to about 50 micrometers (μm). The smaller the diameter of the titanium dioxide particles 10, the higher the uniformity of the sol 200. In one embodiment, the individual diameter of the titanium dioxide particles 10 is about 50 nm.

The mixture can be further agitated to uniformly mix the liquid phase solution and the titanium dioxide particles 10. Agitation can be accomplished through mechanical agitation, magnetic agitation, or supersonic dispersion.

In step S3, a hydrothermal method is used to pyrolyze the carbon source compound. The hydrothermal method can include the following substeps: (S31), disposing the mixture into a hydrothermal reactor such as an autoclave; (S32), heating the mixture, under a hydrothermal temperature of about 150 degrees to about 200 degrees, for about 12 hours to about 72 hours, thereby forming a plurality of carbon coating titanium dioxide particles 100.

Figure 4:
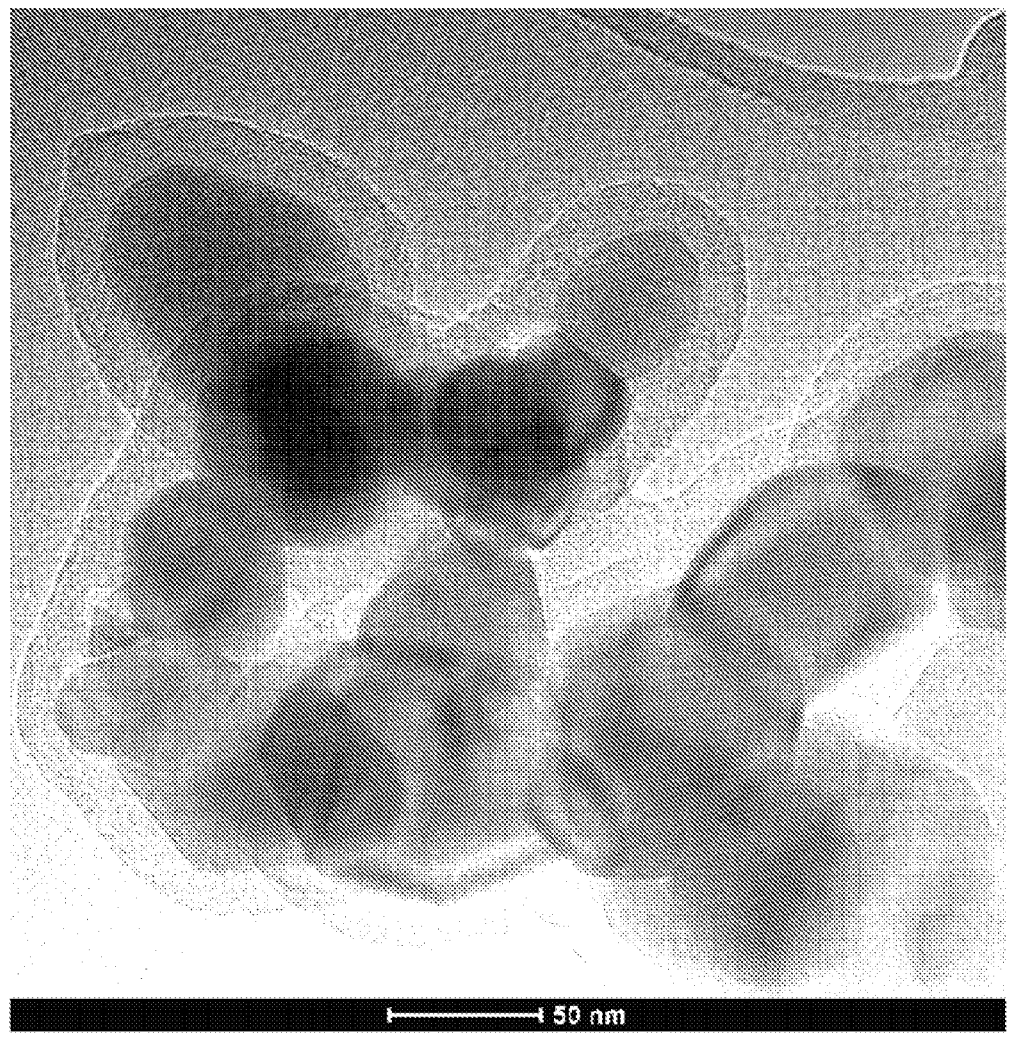
FIG. 4 is a Scanning Electron Microscope (SEM) image of carbon coating titanium dioxide particles, made using one embodiment of a hydrothermal method before heat treatment.

Referring to FIG. 4, in step (S32), the carbon source compound is pyrolyzed to form a carbon layer 20 coated on the surfaces of each of the titanium dioxide particles 10. Specially, hydrogen and oxygen in the carbon source compound are expelled in a form of carbon dioxide ($CO_2$) and water ($H_2O$). The remaining carbon element is absorbed on the surfaces of each of the titanium dioxide particles 10, under a surface tension of titanium dioxide particles 10, to form the carbon layer 20. A great interatomic force exists between the carbon layer 20 and the titanium dioxide particle 10. Thus, the carbon layer 20 cannot be easily exfoliated from the surfaces of each of the titanium dioxide particles 10, and is not prone to be segregated and crystallized.

A pyrolyzing rate of the carbon source compound can be efficiently controlled under the above hydrothermal temperature. If the temperature is too low, the carbon source compound is not sufficiently pyrolyzed. If the temperature is too high, the carbon source compound is easily pyrolyzed to form dissociative carbon, which is not coated on the surfaces of the titanium dioxide particles 10, thus, the carbon source compound cannot be sufficiently used. In one embodiment, the hydrothermal temperature ranges from about 180 degrees to about 185 degrees, and the heating time is about 16 hours.

Furthermore, a catalyzer can be dispersed into the liquid phase solution, before disposing the mixture into the hydrothermal reactor, to increase the pyrolyzing rate of the carbon source compound. The catalyzer can be a salt containing silver ions. A mass ratio of the catalyzer to the carbon source compound can be about 1:200 to about 1:50. In one embodiment, the catalyzer is silver nitrate ($AgNO_3$), the mass ratio of the catalyzer to the carbon source compound is about 1:125.

Figure 5:
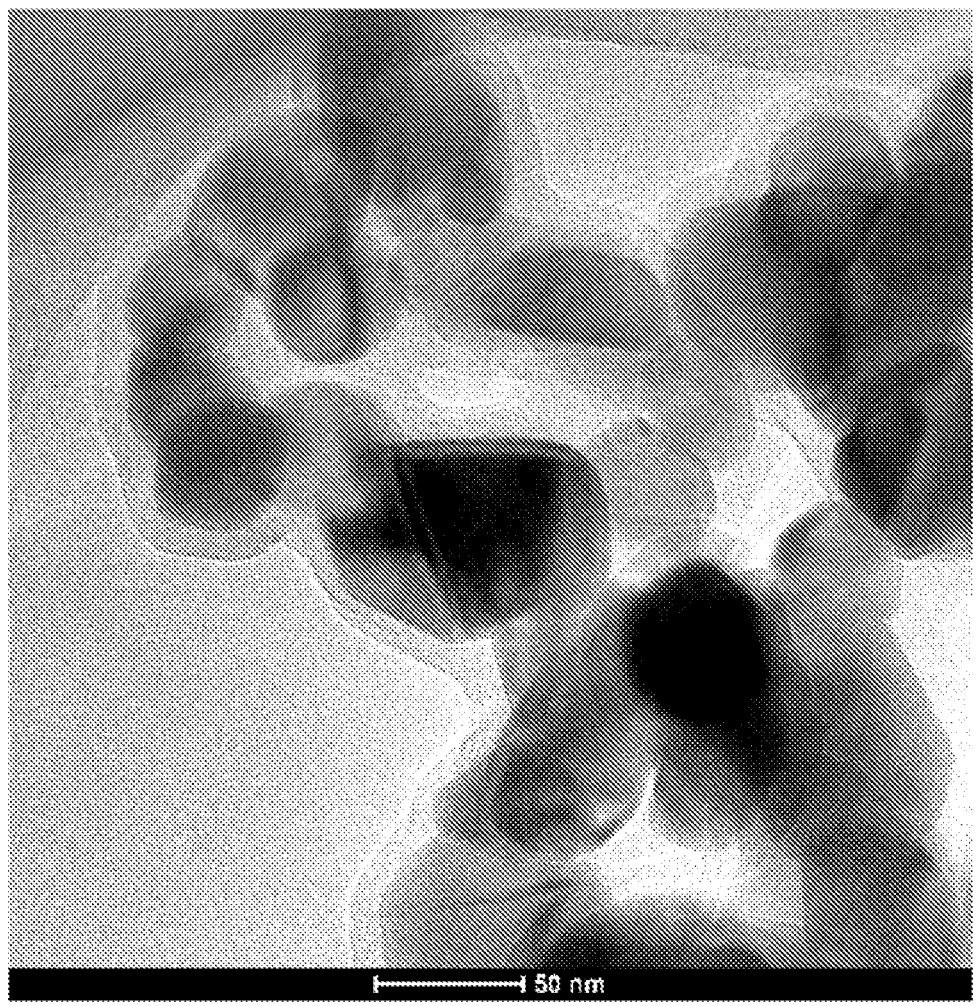
FIG. 5 is an SEM image of carbon coating titanium dioxide particles, made using one embodiment of the hydrothermal method after heat treatment.

Furthermore, the carbon coating titanium dioxide particles 100 can be heated in an inert gas. The heating time can range from about 1 hour to about 3 hours. The heating temperature can range from about 450 degrees Celsius to about 650 degrees Celsius. In one embodiment, the heating temperature is about 500 degrees Celsius, and the heating time is about 2 hours. Referring to FIG. 5, after heating, the remaining carbon source compound coated on the surfaces of each of the titanium dioxide particles 100 is sufficiently pyrolyzed.

The carbon coating titanium dioxide particle 100 includes a titanium dioxide particle 10 and a carbon layer 20 uniformly coated on the surfaces of the titanium dioxide particle 10. A thickness of the carbon layer 20 can range from about 5 nm to about 25 nm.

In step S4, the lithium source solution 30 can be formed by dissolving a lithium salt or lithium hydroxide (LiOH) in a solvent. The lithium salt can be soluble materials such as, lithium carbonate, lithium sulfate, lithium nitrate, and lithium chloride. The solvent can be water, ethanol, or acetone. In one embodiment, the solvent is water. The water can be distilled water or deionized water to avoid introducing impurities.

The sol 200 can be further agitated to uniformly mix the lithium source solution 30 and the carbon coating titanium dioxide particles 100. Agitation can be accomplished through mechanical agitation, magnetic agitation, or supersonic dispersion.

In step S5, the sol 200 can be spray dried by an airflow spray dryer. The spray dryer includes an atomizer and a peristaltic pump. The atomizer includes a two-fluid nozzle. One drying way of the spray dryer is parallel-flow drying.

The step S5 can include the following substeps of: S51 filling the sol 200 into the spray dryer using the peristaltic pump; S52, atomizing the sol 200 using the atomizer, thereby forming a plurality of vaporific liquid drops of the sol 200; and S53, heating the liquid drops in hot air, thereby forming a plurality of porous spherical precursor particles 50.

In step S52, the plurality of vaporific liquid drops has extremely small diameters and large specific surface area.

In step S53, rapid heat exchange can occur between the hot air and the vaporific liquid drops, such that solvent in the liquid drops can be rapidly vaporized, thereby forming porous spherical precursor particles 50. The diameters of the precursor particles 50 can range from about 1 μm to about 10 μm and diameter distributions of the precursor particles 50 are substantially uniform. The precursor particles 50 are regular spherical shaped. The fluidity and machinability of the precursor particles 50 are excellent. Referring to FIGS. 2 and 3, each of the precursor particles 50 includes a plurality of carbon coating titanium dioxide particles 100 gathered into chimps. Surfaces of each of the carbon coating titanium dioxide particles 100 are coated by a lithium hydroxide particle layer 40. A plurality of interspaces exist between the carbon coating titanium dioxide particles 100, thus, each of the precursor particles 50 is a porous spherical structure or spherical-like structure.

In step S6, the precursor particles 50 are heated in an inert gas from about 2 hours to about 40 hours at a temperature ranging from about 400 degrees Celsius to about 1000 degrees Celsius. In one embodiment, the heating temperature is about 700 degrees Celsius, and the heating time is about 16 hours. In the heating process, the titanium dioxide particles 10 and the lithium hydroxide particle layers 40 in the precursor particles 50 can react to form a plurality of nanoscale lithium titanate particles 60. In the reaction process, the lithium hydroxide particles in the lithium hydroxide particle layers 40, can diffuse to a position of the titanium dioxide particles 10 through the carbon layer 20, and react with the titanium dioxide particles 10, thereby forming a lithium titanate composite electrode material 80 including a plurality of carbon coating lithium titanate particles 70. The carbon layer 20 can restrain crystal grain growth of the lithium titanate particles 60. The carbon wrapping lithium titanate articles 70 are spherical or spherical-like, similar to that of the precursor particle 50. In the heating process, the carbon source compound in the carbon layer 20 can be further pyrolyzed.

Another embodiment of a method, for making a lithium titanate composite electrode material includes a step M3 different from the above step S3, and the steps M1, M2, and M4 to M6 are the same as the above steps S1, S2, and S4 to S6.

In the step M3, a dip-coating method is used to pyrolyze the carbon source compound. The step M3 includes the following substeps of:

M31, separating and drying the titanium dioxide particles 10 thereby forming a plurality of titanium dioxide particles 10 coated by the liquid phase solution;

M32, heat treating the titanium dioxide particles 10 coated by the liquid phase solution, thereby forming carbon coating titanium dioxide particles 100.

In step M31, the titanium dioxide particles 10 are separated from the mixture by a hopper. A physical absorption exists between the liquid phase solution and the titanium dioxide particle 10, thus, the liquid phase solution can be absorbed on the surfaces of each of the titanium dioxide particles 10 after separating.

The titanium dioxide particles 10 coated by the liquid phase solution can be rapidly dried. In the drying process, the solvent in the liquid phase solution rapidly volatilizes. Thus, the carbon source compound is not segregated or crystallized to form large crystal grains. The drying method can be vacuum drying or centrifugal drying.

In step M32, the titanium dioxide particles 10 coated by the liquid phase solution are heated in an inert gas. The heating time can range from about 1 hour to about 5 hours. The heating temperature can range from about 450 degrees Celsius to about 650 degrees Celsius. In one embodiment, the heating temperature is about 500 degrees Celsius, and the heating time is about 2 hours. In the heating process, the carbon source compound is gradually softened and pyrolyzed to form a carbon layer 20 coated on the surfaces of each of the titanium dioxide particles 10. In addition, the softened carbon source compound has a high viscosity, thus, a strong absorption force, generated by hydrogen bonds between the carbon source compound and the titanium dioxide particle 10, exists between the carbon source compound and the titanium dioxide particle 10. Accordingly, the pyrolyzed carbon is not easily segregated or crystallized.

Furthermore, the titanium dioxide particles 10 can be immersed into the liquid phase solution from about 1 hour to about 4 hours, before separating and drying the titanium dioxide particles 10. Accordingly, the liquid phase solution can sufficiently coat the surfaces of each of the titanium dioxide particles 10. In one embodiment, the titanium dioxide particles 10 are immersed into the liquid phase solution for about 3 hours.

The carbon layer 20 is formed by pyrolyzing the carbon source compound coated on the titanium dioxide particles 10. Thus, the entire pyrolyzing process of the carbon source compound is not affected by the appearances and diameters of the titanium dioxide particles 10. Thus, a uniform carbon layer 20 can be formed.

In addition, the method for making the titanium dioxide particles 10 coated by the carbon layers 10 is not limited to the above hydrothermal method and the dip-coating method.

In the above method, the titanium dioxide particles 10 coated by the uniform carbon layers 20 directly react with the lithium source solution 30 to form the carbon coating lithium titanate particles 70. Thus, segregation and crystallization of the carbon source compound, induced by irregular appearances and non-uniform diameter distribution of the lithium titanate particles according to the prior art, can be efficiently avoided. Compared with the conventional method for forming the lithium titanate particles of the prior art, the titanium dioxide particles 10 with regular appearances and uniform diameter distributions are easily obtained by the present method. Thus, a uniform carbon layer 20 without segregation and crystallization coated on the titanium dioxide particles 10 is easily fabricated. Furthermore, the lithium titanate particles 60 coated by the uniform carbon layer 20 is easily fabricated. The plurality of precursor particles 50 formed by spray drying are porous, accordingly, the carbon coating lithium titanate particles 70 are porous, thereby increasing moving paths of lithium ions and the effective reaction area of the lithium titanate composite electrode material 80. Thus, a reversible electrochemical property is improved.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A method for making an electrode material of lithium-ion battery, comprising:
    dissolving a carbon source compound into a solvent to form a liquid phase solution;
    providing a plurality of titanium dioxide particles, and dispersing the plurality of titanium dioxide particles into the liquid phase solution, thereby forming a mixture;
    pyrolyzing the carbon source compound, thereby forming a plurality of carbon coating titanium dioxide particles;
    providing a lithium source solution, and mixing the lithium source solution and the plurality of carbon coating titanium dioxide particles, wherein a molar ratio of lithium element to titanium element is in a range from about 4:5 to about 9:10, thereby forming a sol;
    spray drying the sol to form a plurality of precursor particles; and
    heat treating the plurality of precursor particles, thereby forming a lithium titanate composite electrode material.

2. The method as claimed in claim 1, wherein each of the plurality of carbon coating titanium dioxide particles comprises a carbon layer with a thickness of about 5 nm to about 25 nm.

3. The method as claimed in claim 1, wherein a quantity of the liquid phase solution is set as a molar ratio, of about 1:10 to about 2:1, of the carbon element to the titanium element.

4. The method as claimed in claim 3, wherein a concentration of the liquid phase solution ranges from about 10% to about 40%.

5. The method as claimed in claim 1, wherein a diameter of each of the plurality of titanium dioxide particles ranges from about 50 nm to about 50 μm.

6. The method as claimed in claim 1, wherein the step of pyrolyzing the carbon source compound comprises substeps of: disposing the mixture into a hydrothermal reactor; heating the mixture, under a hydrothermal temperature of about 150 degrees Celsius to about 200 degrees Celsius, for about 12 hours to about 72 hours, thereby forming a plurality of carbon coating titanium dioxide particles.

7. The method as claimed in claim 6, wherein the mixture is agitated by mechanical agitating, magnetic agitating, or supersonic dispersing, before disposing the mixture into the hydrothermal reactor.

8. The method as claimed in claim 6, wherein a silver containing salt is further dispersed into the mixture before disposing the mixture into the hydrothermal reactor.

9. The method as claimed in claim 6, wherein the plurality of carbon coating titanium dioxide particles are heated in an inert gas.

10. The method as claimed in claim 1, wherein the plurality of titanium dioxide particles are dispersed into the liquid phase solution for about 1 hour to about 4 hours.

11. The method as claimed in claim 10, wherein the step of pyrolyzing the carbon source compound comprises the substeps of: separating and drying the plurality of titanium dioxide particles, thereby forming a plurality of titanium dioxide particles coated by the liquid phase solution; and heat treating the plurality of titanium dioxide particles coated by the liquid phase solution, thereby forming carbon coating titanium dioxide particles.

12. The method as claimed in claim 11, wherein the drying method is vacuum drying or centrifugal drying.

13. The method as claimed in claim 11, wherein the plurality of titanium dioxide particles coated by the liquid phase solution are heated in an inert gas, in the step of heat treating the plurality of titanium dioxide particles coated by the liquid phase solution.

14. The method as claimed in claim 13, wherein heating temperature ranges from about 450 degrees Celsius to about 650 degrees Celsius, and the heating time ranges from about 1 hour to about 5 hours.

15. The method as claimed in claim 1, wherein the step of spray drying further comprises the substeps of:
filling the sol into a spray dryer by a peristaltic pump;
atomizing the sol by an atomizer, thereby forming a plurality of vaporific liquid drops; and
heating the vaporific liquid drops in a hot air.

16. The method as claimed in claim 1, wherein the plurality of precursor particles are heated in an inert gas, in the step of heat treating the plurality of precursor particles.

17. The method as claimed in claim 16, wherein the heating temperature ranges from about 400 degrees Celsius to about 1000 degrees Celsius, and the heating time ranges from about 2 hours to about 40 hours.

* * * * *